United States Patent
Zhang et al.

(10) Patent No.: US 11,936,056 B2
(45) Date of Patent: Mar. 19, 2024

(54) BATTERY MODULE, BATTERY PACK, AND VEHICLE

(71) Applicant: Huawei Digital Power Technologies Co., Ltd., Shenzhen (CN)

(72) Inventors: Guanghui Zhang, Dongguan (CN); Zhen Qin, Shenzhen (CN); Kai Feng, Shenzhen (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 189 days.

(21) Appl. No.: 17/544,481

(22) Filed: Dec. 7, 2021

(65) Prior Publication Data

US 2022/0181731 A1 Jun. 9, 2022

(30) Foreign Application Priority Data

Dec. 9, 2020 (CN) .......................... 202011429860.9

(51) Int. Cl.
*H01M 50/209* (2021.01)
*H01M 10/04* (2006.01)
*H01M 10/625* (2014.01)

(52) U.S. Cl.
CPC ..... *H01M 50/209* (2021.01); *H01M 10/0431* (2013.01); *H01M 10/625* (2015.04); *H01M 2220/20* (2013.01)

(58) Field of Classification Search
CPC .. H01M 50/209; H01M 10/625; H01M 10/04; H01M 10/0431
See application file for complete search history.

(56) References Cited

U.S. PATENT DOCUMENTS

| | | |
|---|---|---|
| 2015/0050539 A1 | 2/2015 | Peterl et al. |
| 2019/0312322 A1* | 10/2019 | Ahn ................... H01M 50/262 |
| 2020/0259130 A1 | 8/2020 | Gordon et al. |

FOREIGN PATENT DOCUMENTS

| | | |
|---|---|---|
| CN | 101814620 A | 8/2010 |
| CN | 201904409 U | 7/2011 |
| CN | 203774395 U | 8/2014 |
| CN | 105576171 A | 5/2016 |
| CN | 205790283 U | 12/2016 |
| CN | 106784460 A | 5/2017 |
| CN | 206271794 U | 6/2017 |
| CN | 107706449 A | 2/2018 |
| CN | 109411638 A | 3/2019 |
| CN | 110098445 A | 8/2019 |

(Continued)

*Primary Examiner* — Karie O'Neill Apicella
(74) *Attorney, Agent, or Firm* — WOMBLE BOND DICKINSON (US) LLP

(57) ABSTRACT

A battery module, a battery pack, and a vehicle are described in this patent application. In the battery module, a plurality of grooves separated by partition parts are disposed in a module casing, a plurality of jelly rolls of the battery module are embedded in the grooves, and a top cover covers an opening of each groove to seal the groove as an independent mounting cavity. In this way, each groove wall in the module casing and the top cover may be used as a housing for sealing each jelly roll, to avoid a case in which an electrolyte in each jelly roll decomposes and produces gas in a process of using the battery module because the electrolyte is leaked from one jelly roll to another jelly roll.

16 Claims, 5 Drawing Sheets

(56) References Cited

FOREIGN PATENT DOCUMENTS

| | | | | |
|---|---|---|---|---|
| CN | 209329006 U | | 8/2019 | |
| CN | 209329006 U | * | 8/2019 | .......... H01M 10/613 |
| CN | 110323462 A | | 10/2019 | |
| CN | 210074100 U | | 2/2020 | |
| CN | 210123787 U | | 3/2020 | |
| CN | 210349933 U | | 4/2020 | |
| CN | 111477932 A | | 7/2020 | |
| CN | 212113796 U | | 12/2020 | |
| CN | 112290132 A | | 1/2021 | |
| EP | 2228851 A1 | | 9/2010 | |
| EP | 2608309 A1 | | 6/2013 | |
| JP | 2012252958 A | | 12/2012 | |
| WO | 2017193880 A1 | | 11/2017 | |

* cited by examiner

BATTERY MODULE, BATTERY PACK, AND VEHICLE

CROSS-REFERENCE TO RELATED APPLICATION

This application claims priority to Chinese Patent Application No. 202011429860.9, filed on Dec. 9, 2020, which is hereby incorporated by reference in its entirety.

TECHNICAL FIELD

Embodiments of this application relate to the field of energy storage battery technologies, and in particular, to a battery module, a battery pack, and a vehicle.

BACKGROUND

A lithium-ion battery features high specific energy, a long service life, a no memory effect, a low self-discharge rate, environmental friendliness, and the like, and therefore is widely applied to products such as an energy storage base station, an electronic device, and an electric vehicle.

In a conventional technology, a lithium-ion battery module includes a module casing and a plurality of electrochemical cells. The electrochemical cell includes a housing, and the plurality of electrochemical cells are connected in series or in parallel on the module casing. A method for manufacturing the lithium-ion battery module is as follows: Step 1: Manufacture a jelly roll (namely, a bare electrochemical cell) of a lithium-ion battery into an electrochemical cell. Step 2: Manufacture the casing of the battery module. Step 3: Connect manufactured electrochemical cells in series or in parallel, and fasten the electrochemical cells to the casing of the battery module, to finally obtain the battery module with a high voltage and a high capacity.

However, the conventional manufacturing process of the lithium-ion battery module is cumbersome and complex, which increases manufacturing costs.

SUMMARY

Embodiments of this application provide a battery module, a battery pack, and a vehicle, to simplify a conventional manufacturing process of a lithium-ion battery module, and reduce manufacturing costs of the battery module and the battery pack.

An embodiment of this application provides a battery module, including a module casing, a top cover, and a plurality of jelly rolls.

The module casing includes a module housing and a plurality of partition parts located in the module housing, one side of the module housing is of an open structure, the plurality of partition parts partition an inner cavity of the module housing into a plurality of grooves, and each jelly roll is embedded in a corresponding groove.

The top cover covers an opening of the groove to seal the groove.

In this embodiment of this application, the plurality of grooves separated by the partition parts are disposed in the module casing, the plurality of jelly rolls of the battery module are embedded in the grooves, and the top cover covers an opening of each groove to seal the groove as an independent mounting cavity. In this way, each groove wall in the module casing and the corresponding top cover may be used as a housing for sealing each jelly roll, to avoid a case in which an electrolyte in each jelly roll decomposes and produces gas in a process of using the battery module because the electrolyte is leaked from one jelly roll to another jelly roll. In comparison with a conventional battery module, in this embodiment of this application, there is no need to manufacture the jelly roll into an electrochemical cell with a housing, and the jelly roll is directly embedded in each sealed mounting cavity of the module casing, to complete manufacturing of the battery module. In this way, a structure and a manufacturing process of the battery module are simplified, thereby reducing manufacturing costs of the battery module.

In an optional embodiment, each jelly roll includes two first surfaces and two second surfaces.

The two first surfaces are disposed opposite to each other in a first direction of the jelly roll, the two second surfaces are disposed opposite to each other in a second direction of the jelly roll, an area of the first surface is greater than an area of the second surface, and the first direction intersects with the second direction.

First surfaces of two adjacent jelly rolls are disposed opposite to each other in an extension direction of the module casing.

In this embodiment of this application, it is set that for the jelly roll, the area of the first surface is greater than the area of the second surface, and the first surfaces of the two adjacent jelly rolls disposed in the extension direction of the module casing are disposed opposite to each other. In this way, when there is a fixed size of the module casing in the extension direction, more jelly rolls are disposed. Therefore, manufacturing materials of the module casing are saved, and energy density of the battery module is improved.

In an optional embodiment, a cooling channel is formed on at least one of the module housing and the partition part, and the cooling channel is used for circulation of coolant or cold air.

In this embodiment of this application, the cooling channel is formed on the at least one of the module housing and the partition part, so that coolant or cold air is injected into the cooling channel to remove heat transferred from the jelly roll to the module housing or the partition part and to ensure normal working of the jelly roll in the module casing, to prolong a service life of the battery module. In addition, by forming the cooling channel on the module housing or the partition part, space of the module housing or the partition part in a thickness direction is properly used, and space occupied by the cooling channel in the inner cavity of the module housing is saved. Therefore, more jelly rolls are disposed, and energy density of the battery module is improved.

In an optional embodiment, the module housing includes two first sidewalls and two second sidewalls, the two first sidewalls are disposed opposite to each other in an extension direction of the module housing, and the two second sidewalls are disposed opposite to each other in a direction perpendicular to the extension direction of the module housing; and the partition parts include a first partition part and a second partition part that are crosswise disposed, two ends of the first partition part respectively extend to the two first sidewalls, and two ends of the second partition part respectively extend to the two second sidewalls.

In this embodiment of this application, the first partition part and the second partition part that intersect with each other are disposed in the inner cavity of the module housing, to partition space of the module housing in the extension direction and to partition space in the direction perpendicular to the extension direction, that is, a plurality of grooves are formed in each of the extension direction of the module housing and the direction perpendicular to the extension direction. In this way, a quantity of grooves is increased, and therefore a quantity of jelly rolls accommodated in the module casing is increased.

In an optional embodiment, the cooling channel is formed on each of the module housing and the second partition part.

In this embodiment of this application, the cooling channel is formed on each of the module housing and the second partition part, so that when the first surfaces, of the two adjacent jelly rolls, with a larger area are disposed opposite to each other in the extension direction of the module casing, coolant or cold air on the first sidewall of the module housing and the second partition part may be used to dissipate heat for the first surfaces, of the jelly rolls, with a larger area, to ensure heat dissipation efficiency for the jelly roll in the module casing while simplifying a structure of the module casing.

In an optional embodiment, a first cooling channel is formed on each of the two first sidewalls and the two second sidewalls, an extension direction of the first cooling channel is the same as an extension direction of a corresponding sidewall, and first cooling channels on the first sidewall and the second sidewall communicate with each other; and
 a second cooling channel is formed on the second partition part, and two ends of the second cooling channel respectively extend to first cooling channels on the two second sidewalls.

In this application, the first cooling channel on the module housing and the second cooling channel on the second partition part are disposed to communicate, so that the first cooling channel and the second cooling channel form a communicating network structure on the module casing. In this way, coolant or cold air injected from a first cooling channel on any sidewall can flow into a second cooling channel on each second partition part, to effectively dissipate heat for each jelly roll. In addition, the first cooling channels are disposed in extension directions of the four sidewalls of the module housing, and the second cooling channel is disposed in an extension direction of the second partition part, so that coolant or cold air in the first cooling channel and the second cooling channel can be used to dissipate heat for each jelly roll disposed in the extension direction of the module casing and to dissipate heat for each jelly roll disposed in a direction perpendicular to the extension direction of the module casing, to improve heat dissipation efficiency of the battery module.

In an optional embodiment, both the first cooling channel and the second cooling channel are used for circulation of coolant, to improve heat dissipation efficiency of each jelly roll.

In an optional embodiment, a water inlet and a water outlet that communicate with the first cooling channel are formed on the module housing; and
 the water inlet and the water outlet are respectively disposed on the two first sidewalls, or the water inlet and the water outlet are respectively disposed on the two second sidewalls.

In this embodiment of this application, the water inlet and the water outlet that communicate with the first cooling channel are respectively disposed on the two first sidewalls, so that coolant injected from the water inlet into one of the first sidewalls can enter each second partition part through the two second sidewalls, then flow into the other first sidewall, and finally be discharged from the water outlet on the other first sidewall to an outside of the battery module, to extend a circulation path of the coolant and ensure that the coolant can be used to effectively dissipate heat for each jelly roll.

In an optional embodiment, there are a plurality of first cooling channels, and the plurality of first cooling channels are disposed at intervals in a height direction of the module housing.

Correspondingly, there are a plurality of second cooling channels, the plurality of second cooling channels are disposed at intervals in a height direction of the second partition part, and two ends of each second cooling channel respectively communicate with corresponding first cooling channels.

In this embodiment of this application, a plurality of cooling channels are disposed on each of the module housing and the second partition part, and the plurality of cooling channels are disposed at intervals in a height direction of the module casing, to increase a heat exchange area between the cooling channel and the jelly roll in the height direction, to improve heat dissipation efficiency of the battery module.

In an optional embodiment, a third cooling channel is formed on each first sidewall, and a fourth cooling channel is formed on the second partition part.

The third cooling channel extends in a height direction of the first sidewall, and two ends of the third cooling channel penetrate through a top surface and a bottom surface of the first sidewall, so that coolant or cold air that enters the third cooling channel from the top surface or the bottom surface of the first sidewall can be smoothly discharged from the other end of the first sidewall to an outside of the module casing. In this way, circulation efficiency of a medium in the third cooling channel is improved, and therefore heat dissipation efficiency of jelly rolls on one side of the first sidewall is improved. The fourth cooling channel extends in a height direction of the second partition part, and two ends of the fourth cooling channel respectively penetrate through a top surface and a bottom surface of the second partition part, so that coolant or cold air that enters the fourth cooling channel from the top surface or the bottom surface of the second partition part can be smoothly discharged from the other end of the second partition part to the outside of the module casing. In this way, circulation efficiency of a medium in the fourth cooling channel is improved, and therefore heat dissipation efficiency of jelly rolls on one side of the second partition part is improved. In addition, in the manner of disposing the third cooling channel and the fourth cooling channel, the structure of the module casing is simplified, and manufacturing efficiency of the module casing is improved.

In an optional embodiment, both the third cooling channel and the fourth cooling channel are used for circulation of cold air, and heat dissipation is performed for the jelly roll in the module casing by using the cold air. In addition, the third cooling channel and the fourth cooling channel facilitate entry of air outside the module casing, and also facilitate discharge of air inside the module casing to the outside. That is, in the manner of disposing the third cooling channel and the fourth cooling channel, circulation of cold air inside and outside the module casing is facilitated, to effectively dissipate heat for the jelly roll in the module casing.

In an optional embodiment, there are a plurality of third cooling channels and a plurality of fourth cooling channels, and the plurality of third cooling channels and the plurality of fourth cooling channels are disposed at intervals in a direction perpendicular to the extension direction of the module casing, to increase a heat exchange area between the cooling channel on the module casing and the jelly roll, to improve heat dissipation efficiency of the jelly roll with respect to the cooling channel on the module casing.

In an optional embodiment, there are a plurality of second partition parts, and the plurality of second partition parts are disposed at intervals in the extension direction of the module casing, to further increase a quantity of grooves in the module casing and improve energy density of the battery module.

In an optional embodiment, there are a plurality of top covers, and each top cover covers an opening of a corresponding groove, to improve a sealing effect of a mounting cavity formed by each groove and the top cover.

In an optional embodiment, each top cover is connected to a tab of a corresponding jelly roll by using a battery post, and the two adjacent jelly rolls are connected in parallel or in series by using a conductive connector connected to the battery post. In this way, an electrical connection structure between the jelly rolls in the battery module is simplified while it is ensured that the jelly rolls are electrically connected, thereby improving manufacturing efficiency of the battery module.

An embodiment of this application further provides a battery pack, including a battery pack casing and the foregoing battery module. All of a plurality of battery modules are fastened to the battery pack casing.

In this embodiment of this application, the plurality of battery modules are fastened to the battery pack casing to form the battery pack. In this way, a structure and a manufacturing process of the battery pack are simplified, and manufacturing costs of the battery pack are reduced.

An embodiment of this application further provides a vehicle. The vehicle includes an electrical device and the foregoing battery module, or
 includes an electrical device and the foregoing battery pack.

The battery module or the battery pack is electrically connected to the electrical device, to supply electric energy to the electrical device.

In this embodiment of this application, the foregoing battery module or battery pack is disposed in the vehicle. In this way, a structure and a manufacturing process of the battery pack or the battery module are simplified, and therefore a manufacturing process of the entire vehicle is simplified, and manufacturing costs of the entire vehicle are reduced.

DESCRIPTION OF EMBODIMENTS

Figure 1:
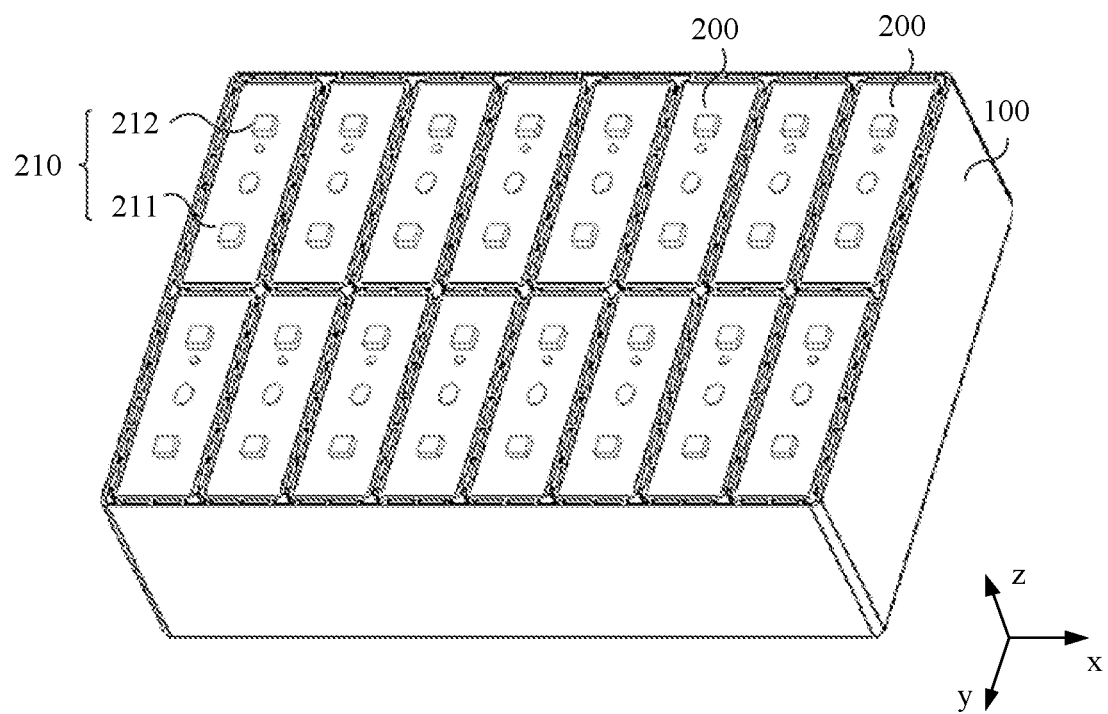
FIG. 1 is a schematic structural diagram of a battery module according to an embodiment of this application.

Terms used in embodiments of this application are merely used to explain specific embodiments of this application, but are not intended to limit this application.

With the guidance and promotion of policies in the field of new energy at home and abroad, technological innovation of a lithium-ion battery in energy storage, communications, an electric vehicle, and the like develops rapidly, technical research on the lithium-ion battery is gradually deepened, industrialization of the lithium-ion battery is rapidly improved, and there is an increasingly high requirement for a client to which the lithium-ion battery is applied.

In an application process, the lithium-ion battery usually exists in a form of a lithium-ion battery module or a lithium-ion battery pack (collectively referred to as a battery pack below) with relatively high energy density. The lithium-ion battery module is obtained by fastening a plurality of lithium-ion battery cells (collectively referred to as electrochemical cells below) to a casing of the battery module, and connecting the plurality of electrochemical cells in series and/or in parallel. The battery pack is obtained by fastening a plurality of manufactured battery modules to a casing of the battery pack, and connecting electrochemical cells in the plurality of battery modules in series and/or in parallel.

Currently, in application fields such as energy storage and electric vehicles, a conventional method for manufacturing the lithium-ion battery module is as follows:

Step 1: Manufacture a jelly roll (which is also referred to as a bare electrochemical cell) of a lithium-ion battery into an electrochemical cell. For example, a metal housing is wrapped around the jelly roll to protect the jelly roll and to prevent an electrolyte in the jelly roll from leakage.

Step 2: Manufacture the casing of the battery module.

Step 3: Connect manufactured electrochemical cells in series and/or in parallel, and fasten the electrochemical cells to the casing of the battery module, to finally obtain the battery module with a high voltage and a high capacity.

A conventional method for manufacturing the battery pack is to first manufacture the casing of the battery pack, and then fasten the plurality of manufactured lithium-ion battery modules to the casing of the battery pack, and connect electrochemical cells in the plurality of battery modules in series and/or in parallel, to finally obtain the battery pack with more energy.

However, in the foregoing manufacturing process of the lithium-ion battery module, the jelly roll needs to be first manufactured into an electrochemical cell with a housing, and then the plurality of electrochemical cells are fastened to the casing of the battery module, to avoid a case in which an electrolyte in each electrochemical cell fastened to the module casing decomposes and produces gas in a use process because the electrolyte is leaked from one jelly roll to another jelly roll. The entire manufacturing process is cumbersome and complex, which increases manufacturing costs of the lithium-ion battery module and further increases manufacturing costs of the battery pack.

The embodiments of this application provide a vehicle, a battery pack, and a battery module. A plurality of grooves separated by partition parts are disposed in a module casing, a plurality of jelly rolls of the battery module are embedded in the grooves, and a top cover covers an opening of each groove to seal the groove as an independent mounting cavity. In this way, each groove wall in the module casing and the corresponding top cover may be used as a housing for sealing each jelly roll, to avoid a case in which an electrolyte in each jelly roll decomposes and produces gas in a process of using the battery module because the electrolyte is leaked from one jelly roll to another jelly roll. In comparison with a conventional battery module, in the embodiments of this application, there is no need to manufacture the jelly roll into an electrochemical cell with a housing, and the jelly roll is directly embedded in each sealed mounting cavity of the module casing, to complete manufacturing of the battery module. In this way, structures and manufacturing processes of the battery module and the battery pack are simplified, thereby reducing manufacturing costs of the battery module and the battery pack.

The following describes in detail specific structures of the vehicle, the battery pack, and the battery module in the embodiments of this application by using several scenarios.

Scenario 1

Figure 2:
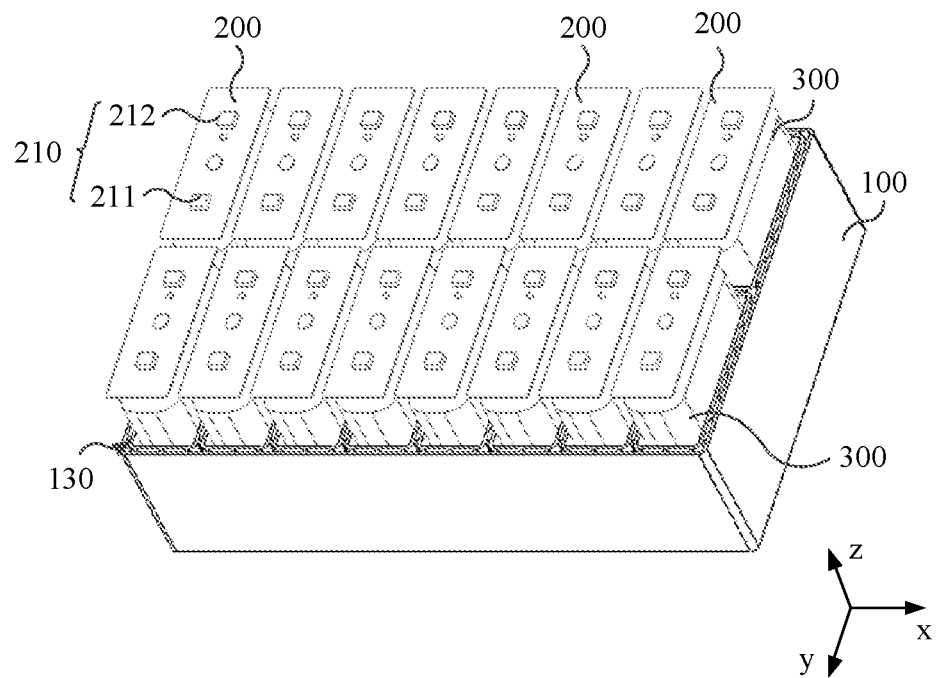
FIG. 2 is a status diagram of a battery module in an assembly process according to an embodiment of this application.
Figure 3:
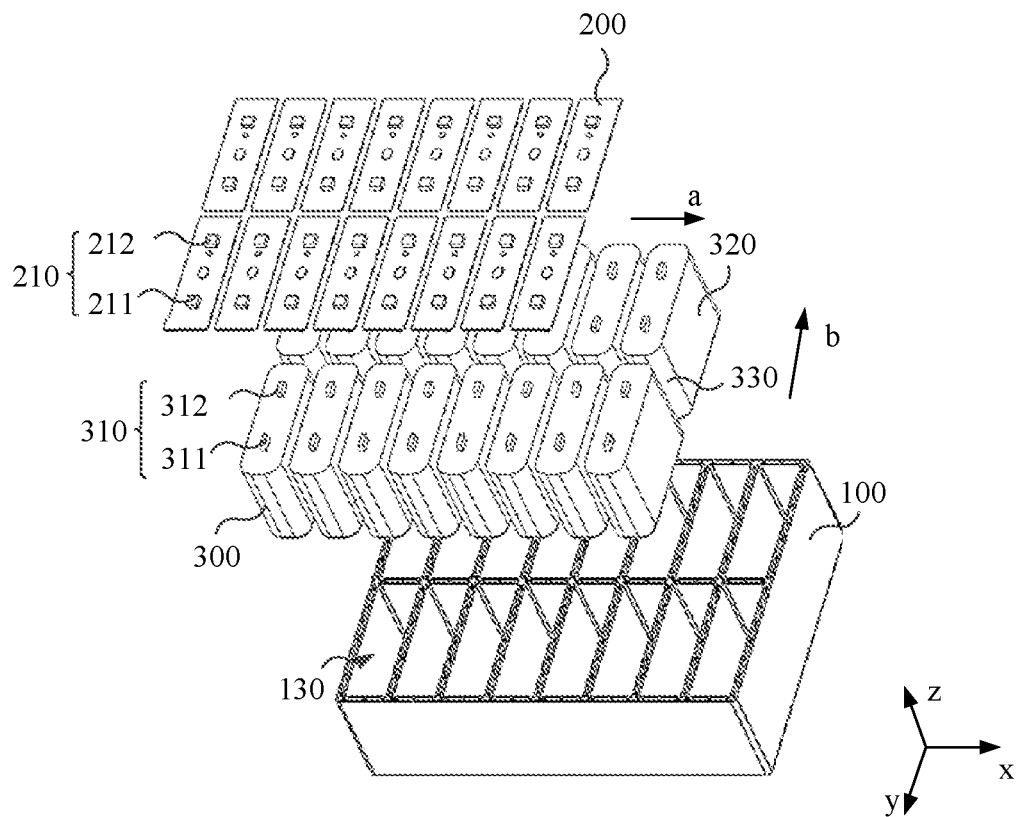
FIG. 3 is an exploded schematic diagram of FIG. 1.

FIG. 1 is a schematic structural diagram of a battery module according to an embodiment of this application, FIG. 2 is a status diagram of a battery module in an assembly process according to an embodiment of this application, and FIG. 3 is an exploded schematic diagram of FIG. 1. Referring to FIG. 1 to FIG. 3, an embodiment of this application provides a battery module, including a module casing 100, a top cover 200, and a plurality of jelly rolls 300.

Referring to FIG. 3, the jelly roll 300 in this embodiment of this application may be a bare electrochemical cell of a conventional lithium-ion battery, or certainly, may be a bare electrochemical cell of another type of battery. The jelly roll 300 includes a positive electrode plate, a negative electrode plate, a separator, and a tab 310. The positive electrode plate and the negative electrode plate are disposed in a laminated winding manner around an axis of the jelly roll 300, and a separator is disposed between the positive electrode plate and the negative electrode plate and at an outermost layer of the jelly roll 300. For example, the positive electrode plate is wound at an outer layer of the negative electrode plate, and the separator is wound between the positive electrode plate and the negative electrode plate and on a side of the positive electrode plate that is away from the negative electrode plate.

In addition, a tab 310 is disposed on each of the positive electrode plate and the negative electrode plate. The tab 310 is configured to electrically connect a positive electrode plate and a negative electrode plate of a jelly roll 300 to a positive electrode plate or a negative electrode plate of another jelly roll 300. For ease of description, in this embodiment of this application, a tab 310 on the positive electrode plate is used as a positive tab 311, and a tab 310 on the negative electrode plate is used as a negative tab 312.

When a positive tab 311 of a jelly roll 300 is electrically connected to a negative tab 312 of another jelly roll 300 or a negative tab 312 of a jelly roll 300 is electrically connected to a positive tab 311 of another jelly roll 300, the two jelly rolls 300 may be disposed in series. When a positive tab 311 of a jelly roll 300 is electrically connected to a positive tab 311 of another jelly roll 300 or a negative tab 312 of a jelly roll 300 is electrically connected to a negative tab 312 of another jelly roll 300, the two jelly rolls 300 may be disposed in parallel. For a specific structure of the jelly roll 300, directly refer to a jelly roll 300 in a conventional technology. Details are not described herein.

Figure 4:
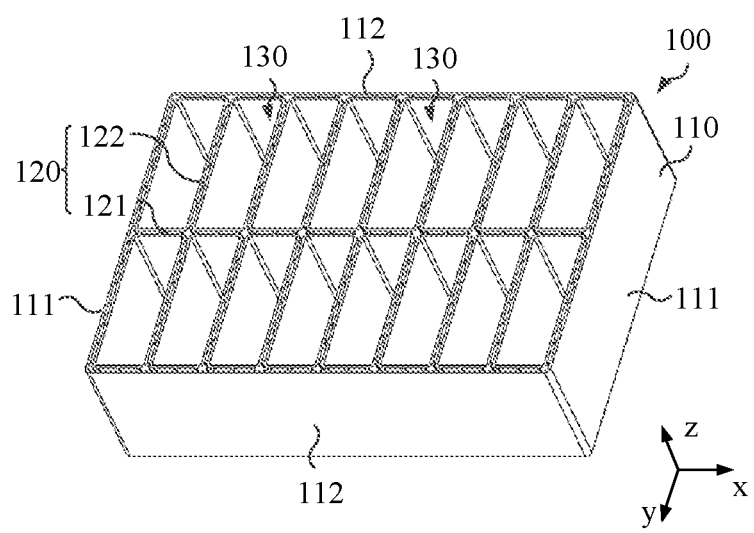
FIG. 4 is a schematic structural diagram of a module casing in FIG. 3.

FIG. 4 is a schematic structural diagram of a module casing in FIG. 3. Referring to FIG. 4, the module casing 100 in this embodiment of this application includes a module housing 110 and a plurality of partition parts 120 located in the module housing 110. One side of the module housing 110 is of an open structure, that is, there is an opening on the one side of the module housing 110.

For example, the module housing 110 in this embodiment of this application includes a bottom wall and sidewalls that surround an outer edge of the bottom wall, and the sidewalls extend upward from the outer edge of the bottom wall, so that the bottom wall and the sidewalls form an inner cavity of the module housing 110. One side of the inner cavity is open. For example, a top of the inner cavity is open, that is, the top of the module housing 110 is of an open structure.

The plurality of partition parts 120 in this embodiment of this application are disposed in the inner cavity of the module housing 110, and the plurality of partition parts 120 partition the inner cavity of the module housing 110 into a plurality of grooves 130. As shown in FIG. 2 and FIG. 3, each jelly roll 300 is embedded in a corresponding groove 130. For example, the plurality of partition parts 120 in this embodiment of this application are disposed at intervals in the inner cavity of the module housing 110 in a direction of the module casing 100, for example, an extension direction (refer to a direction x in FIG. 4), to partition the inner cavity of the module housing 110 into a plurality of grooves 130 disposed in the direction.

It may be understood that in the foregoing example, a quantity of grooves 130 is equal to a quantity of partition parts 120+1, and one jelly roll 300 is embedded in each groove 130. In this way, jelly rolls 300 whose quantity is equal to the quantity of partition parts 120+1 may be embedded in the module casing 100. For example, when there are two partition parts 120 in this embodiment of this application, and the two partition parts 120 are disposed at intervals in the inner cavity of the module housing 110 in a direction of the module casing 100, for example, the extension direction, the inner cavity of the module housing 110 is partitioned into three grooves 130, and one jelly roll 300 is embedded in each groove 130, so that three jelly rolls 300 may be embedded in the module casing 100.

The quantity of partition parts 120 in this embodiment of this application may be adjusted based on an actual requirement. This is not limited herein.

For ease of description, in this embodiment of this application, a direction x in FIG. 1 is used as an extension direction of the battery module, a direction y in FIG. 1 is used as a width direction of the battery module, and a direction z in FIG. 1 is used as a height direction of the battery module. The extension direction of the battery module is the same as the extension direction of the module casing 100, the width direction of the battery module is the same as a width direction of the module casing 100, and the height direction of the battery module is the same as a height direction of the module casing 100.

Referring to FIG. 1, the direction x is a direction indicated by an axis x, the direction y is a direction indicated by an axis y, and the direction z is a direction indicated by an axis z.

During specific manufacturing, the module casing 100 in this embodiment of this application may be of a proper structure such as a cuboid structure, a cubic structure, or a cylindrical structure. Referring to FIG. 4, in this embodiment of this application, description is specifically provided by using an example in which the module casing 100 is of a cuboid structure. For example, in the module casing 100, the bottom wall of the module housing 110 is of a rectangular structure, and the sidewalls of the module housing 110 include two first sidewalls 111 and second sidewalls 112. The two first sidewalls 111 are respectively disposed at two ends of the bottom wall that are disposed opposite to each other in the extension direction (refer to the direction x in FIG. 4). The two second sidewalls 112 are respectively disposed at two ends of a bottom wall that are disposed opposite to each other in the width direction (refer to the direction y in FIG. 4). The bottom wall, the two first sidewalls 111, and the two second sidewalls 112 jointly form the inner cavity of the module housing 110.

When the module casing 100 is of a cuboid structure, the extension direction of the module casing 100 is a length direction of the module casing 100. In some examples, the plurality of partition parts 120 of the module casing 100 may be disposed at intervals in the inner cavity of the module housing 110 in the length direction of the module casing 100. Two ends of each partition part 120 respectively extend to the first sidewall 111 and the second sidewall 112 of the module housing 110.

In some other examples, in the plurality of partition parts 120 of the module casing 100, some of the partition parts 120 may be disposed at intervals in the inner cavity of the module housing 110 in the extension direction of the module casing 100, and the other partition parts 120 may be disposed at intervals in the inner cavity of the module housing 110 in a direction, for example, the width direction, perpendicular to the extension direction of the module casing 100.

Referring to FIG. 4, for ease of description, the partition parts 120 in this example may include a first partition part 121 and a second partition part 122 that are crosswise disposed. Two ends of the first partition part 121 respectively extend to the two first sidewalls 111, and two ends of the second partition part 122 respectively extend to the two second sidewalls 112.

In this embodiment of this application, the first partition part 121 and the second partition part 122 that intersect with each other are disposed in the inner cavity of the module housing 110, to partition space of the module housing 110 in the extension direction (refer to the direction x in FIG. 4) and to partition space in the direction, for example, the width direction (refer to the direction y in FIG. 4) of the module housing 110, perpendicular to the extension direction, that is, a plurality of grooves 130 are formed in each of the extension direction of the module housing 110 and the direction perpendicular to the extension direction. In this way, the quantity of grooves 130 is increased, and therefore a quantity of jelly rolls 300 accommodated in the module casing 100 is increased.

During specific disposing, there may be one first partition part 121, and two ends of the one first partition part 121 respectively extend to the two first sidewalls 111, to partition the inner cavity of the module housing 110 into two grooves 130, namely, a front groove and a rear groove, in the width direction. In addition, there is one second partition part 122, and two ends of the one second partition part 122 respectively extend to the two second sidewalls 112, to partition the inner cavity of the module housing 110 into two halves, namely, a left half and a right half, in the extension direction. That is, each of the two grooves 130, namely, the front groove and the rear groove, is partitioned into two grooves 130, namely, a left groove and a right groove, so that four mutually independent grooves 130 are formed in the module casing 100.

In this embodiment of this application, there may be a plurality of first partition parts 121, or, a plurality of second partition parts 122, or, a plurality of first partition parts 121 and a plurality of second partition parts 122. For example, refer to FIG. 4. There may be a plurality of second partition parts 122, and the plurality of second partition parts 122 are disposed at intervals in the extension direction (direction x) of the module casing 100, to partition the inner cavity of the module housing 110 into a plurality of grooves 130 that are sequentially disposed at intervals in the extension direction (direction x), to further increase the quantity of grooves 130 in the module casing 100 and improve energy density of the battery module.

Still referring to FIG. 4, for example, there is one first partition part 121, there are seven second partition parts 122, the seven second partition parts 122 are disposed at intervals in the extension direction (direction x) of the module casing 100, and the one first partition part 121 and the seven second partition parts 122 partition the inner cavity of the module housing 110 into 16 mutually independent grooves 130. Every eight grooves 130 are disposed in a row, and are disposed at intervals in the extension direction (i.e., direction x) of the module casing 100. The module casing 100 includes two rows of grooves 130 disposed in the width direction (i.e., direction y). It may be understood that a quantity of second partition parts 122 may be a proper discrete value such as 2, 3, 4, 5, or 6, and may be specifically adjusted based on an actual requirement.

Certainly, there may also be a plurality of first partition parts 121 (not shown in the figure). For example, a quantity of first partition parts 121 may be a proper discrete value such as 2, 3, 4, 5, or 6, and may be specifically adjusted based on an actual requirement. For example, there are two first partition parts 121, and the two first partition parts 121 are disposed at intervals in the width direction of the module casing 100, to partition the inner cavity of the module housing 110 into three rows of grooves 130 in the width direction. In this way, when there are seven second partition parts 122, the inner cavity of the module housing 110 may be partitioned into 3*8=24 grooves 130.

It may be understood that the quantity of grooves 130 in the module casing 100 is equal to (the quantity of first partition parts 121+1)*(the quantity of second partition parts 122+1).

The module casing 100 may be integrally formed. For example, the module housing 110 and the partition parts 120 are integrally formed. In this way, an assembly process of the module casing 100 is simplified, and overall structural strength of the module casing 100 is enhanced, to ensure that the jelly roll 300 is securely assembled into the module casing 100.

Certainly, in another example, the partition part 120 may be fastened in the module housing 110 in a detachable manner. For example, the partition part 120 may be fastened to an inner wall of the module housing 110 through bonding, clamping, or a screw. In this embodiment of this application, a connection manner between the partition part 120 and the module housing 110 is not specifically limited provided that the partition part 120 can be securely fastened in the inner cavity of the module housing 110 to secure the formed groove 130.

In addition, the module casing 100 in this embodiment of this application may include but is not limited to any one of an aluminum casing, a steel casing, and a high temperature-resistant plastic casing. For example, both the housing and the partition part 120 of the module casing 100 are made of metal aluminum, so that the module casing 100 is formed as an aluminum casing. In this way, rigidity of the module casing 100 is ensured, and a weight of the module casing 100 is reduced, to facilitate transportation of the battery module finally obtained by using the module casing 100.

Refer to FIG. 1 and FIG. 2. The top cover 200 in this embodiment of this application covers an opening of the groove 130 to seal the groove 130.

During specific implementation, there may be one top cover 200, and the one top cover 200 covers an opening of the module casing 100. In this way, a corresponding region of the top cover 200 covers an opening of each groove 130 to seal each groove 130. For example, during specific assembly, a part of the top cover 200 that corresponds to the opening of each groove 130 is closely attached to a top end of a groove wall of the corresponding groove 130, or a part of the top cover 200 that corresponds to the opening of each groove 130 may be connected to a top end of a groove wall of the corresponding groove 130 in a sealing manner, to improve a sealing effect of each groove 130.

Referring to FIG. 1 and FIG. 2, certainly, in some examples, there may be a plurality of top covers 200. A quantity of top covers 200 is the same as the quantity of grooves 130. Each top cover 200 covers an opening of a corresponding groove 130, to seal the opening of the groove 130.

The top cover 200 is disposed on the opening of each groove 130, to improve a sealing effect of a mounting cavity formed by each groove 130 and the top cover 200.

The top cover 200 may include but is not limited to any one of an aluminum cover, a steel cover, and a plastic cover. The top cover 200 may be specifically made of a material the same as that of which the module casing 100 is made. For example, both the top cover 200 and the module casing 100 are made of an aluminum material.

In this embodiment of this application, the module casing 100 and the top cover 200 form an integrated battery module casing, the top cover 200 seals the groove 130 in the module housing 110 as an independent mounting cavity, and each jelly roll 300 is disposed in a corresponding mounting cavity. For example, when the module housing 110 is partitioned into three grooves 130 by the plurality of partition parts 120, there may be three top covers 200 in this embodiment of this application, and the three top covers 200 respectively cover openings of the three grooves 130, to seal all of the three grooves 130 as independent mounting cavities. The jelly roll 300 is embedded in each mounting cavity.

Referring to FIG. 1, the top cover 200 in this embodiment of this application may be welded to the opening of the corresponding groove 130 in the module housing 110. For example, the top cover 200 is disposed on the opening of each groove 130. When the groove 130 is formed by the partition part 120 and the sidewall of the module housing 110, each top cover 200 is welded to the partition part 120 and the sidewall of the module housing 110.

In this embodiment of this application, the top cover 200 is welded to the module casing 100. In this way, a connection structure between the top cover 200 and the module casing 100 is simplified to improve manufacturing efficiency of the battery module, and the top cover 200 is more securely disposed on the module casing 100. In addition, a sealing effect of the mounting cavity formed by the top cover 200 and the groove 130 in the module casing 100 is ensured.

Certainly, in this embodiment of this application, another manner of fastening the top cover 200 and the module casing 100 is not excluded. For example, the top cover 200 may be fastened to the partition part 120 and the sidewall of the module housing 110 through bonding.

In addition, referring to FIG. 2 and FIG. 3, the top cover 200 in this embodiment of this application may be connected to a tab 310 of a corresponding jelly roll 300 by using a battery post 210. In the battery module in this embodiment of this application, two adjacent jelly rolls 300 are connected in parallel or in series by using a conductive connector connected to the battery post 210. In this way, an electrical connection structure between the jelly rolls 300 in the battery module is simplified while it is ensured that the jelly rolls 300 are electrically connected, thereby improving manufacturing efficiency of the battery module.

For example, the battery module includes a plurality of top covers 200, and each top cover 200 may be connected to two tabs 310 of a corresponding jelly roll 300 by using two battery posts 210. For ease of description, the two battery posts 210 may be respectively used as a first battery post 211 and a second battery post 212. One end of the first battery post 211 is connected to the top cover 200, and the other end of the first battery post 211 is connected to the positive tab 311 in the jelly roll 300. Correspondingly, one end of the second battery post 212 is connected to the top cover 200, and the other end of the second battery post 212 is connected to the negative tab 312 in the jelly roll 300. In this way, first battery posts 211 or second battery posts 212 on two adjacent jelly rolls 300 may be electrically connected by using a conductive connector, to connect the two adjacent jelly rolls 300 in parallel. In two adjacent jelly rolls 300, a first battery post 211 on one jelly roll 300 and a second battery post 212 on the other jelly roll 300 are connected by using a conductive connector, or a second battery post 212 on one jelly roll 300 and a first battery post 211 on the other jelly roll 300 are connected by using a conductive connector, to connect the two adjacent jelly rolls 300 in series. The conductive connector may be a copper bar connected between the two battery posts 210.

It may be understood that unlike the foregoing example, when the battery module includes one top cover 200, a region of the top cover 200 that corresponds to each jelly roll 300 may be considered as a separate top cover 200 in the foregoing example. That is, the region of the top cover 200 that corresponds to each jelly roll 300 may be connected to two tabs 310 of the jelly roll 300 by using two battery posts 210. For serial/parallel connection between two adjacent jelly rolls 300, directly refer to the content in the foregoing example. Details are not described herein.

In this embodiment of this application, the top cover 200 and a groove wall of the corresponding groove 130 may be used as a housing of the jelly roll 300. In this way, when the jelly roll 300 is embedded in each sealed mounting cavity of the module casing 100 in this embodiment of this application, a case in which an electrolyte in a battery compartment of each jelly rolls 300 decomposes and produces gas in a process of using the battery module because the electrolyte is leaked from one jelly roll to another jelly roll can be effectively avoided. The electrolyte may be injected into the jelly roll 300 after the jelly roll 300 is assembled into the groove 130 in the module housing 110, and then the groove 130 is sealed by the top cover 200, so that the jelly roll 300 into which the electrolyte is injected is sealed in the mounting cavity formed by the top cover 200 and the module casing 100.

When being assembled into the module casing 100, each jelly roll 300 may be placed only in the mounting cavity formed by the module casing 100 and the top cover 200, that is, there is no connection between each jelly roll 300 and an inner wall of the corresponding mounting cavity, to improve assembly efficiency of the battery module. Certainly, in another example, an outer wall of each jelly roll 300 may be fastened in a corresponding mounting cavity through bonding, a screw, clamping, or the like, to further dispose the jelly roll 300 in the mounting cavity more securely, to improve structural stability of the entire battery module.

In addition, an outer sidewall of each jelly roll 300 may be in contact with the groove wall of the groove 130, to dispose the jelly roll 300 in the groove 130 more securely and reduce a size of the entire battery module. Certainly, in some examples, there may be a specific gap between the outer sidewall of each jelly roll 300 and the groove wall of the groove 130, to facilitate assembly of the jelly roll 300 into the groove 130 in the module casing 100.

The following describes a specific manufacturing process of the battery module by using an example in which the battery module in this embodiment of this application includes a plurality of top covers 200. Details are as follows:

S101. Manufacture the module casing 100. For example, the module casing 100 is die-casted by using an aluminum material. The module casing 100 includes a plurality of grooves 130.

S102. Respectively embed the plurality of jelly rolls 300 in the grooves 130 of the module casing 100 obtained in S101, and inject an electrolyte into a jelly roll 300 in each groove 130.

S103. Manufacture top covers 200 in batches. For example, the top cover 200 is die-casted by using an aluminum material.

S104. Respectively cover openings of the grooves 130 in which the jelly rolls 300 are embedded in S102 with the top covers 200 manufactured in S103 to seal the grooves 130, and connect the top covers 200 to tabs 310 on the corresponding jelly rolls 300 by using corresponding battery posts 210. The top covers 200 may be welded to the openings of the grooves 130 to form an integrated battery module by using the top covers 200 and the module casing 100.

S105. Connect battery posts 210 on two adjacent jelly rolls 300 by using a conductive connector such as a copper bar, to connect the jelly rolls 300 in series or in parallel, to finally obtain the battery module in this embodiment of this application.

It may be learned from the foregoing description that in this embodiment of this application, the plurality of grooves 130 separated by the partition parts 120 are disposed in the module casing 100, the plurality of jelly rolls 300 of the battery module are embedded in the grooves 130, and the top cover 200 covers the opening of each groove 130 to seal the groove 130 as an independent mounting cavity. In this way, each groove wall in the module casing 100 and the corresponding top cover 200 may be used as a housing for sealing each jelly roll 300, to avoid a case in which an electrolyte in a battery compartment of each jelly roll 300 decomposes and produces gas in the process of using the battery module because the electrolytes leaked from one jelly roll to another jelly roll.

In comparison with a conventional battery module, in this embodiment of this application, there is no need to manufacture the jelly roll 300 into an electrochemical cell with a housing, and the jelly roll 300 is directly embedded in each sealed mounting cavity of the module casing 100, to complete manufacturing of the battery module. In this way, a structure and a manufacturing process of the battery module are simplified, and manufacturing costs of the battery module are reduced.

During specific disposing, each jelly roll 300 in this embodiment of this application may be of a proper structure such as a cuboid structure, a cubic structure, or a cylindrical structure, and may be specifically adjusted based on an actual requirement.

Referring to FIG. 3, each jelly roll 300 may include two first surfaces 320 and two second surfaces 330. The two first surfaces 320 are disposed opposite to each other in a first direction of the jelly roll 300. The two second surfaces 330 are disposed opposite to each other in a second direction of the jelly roll 300. An area of the first surface 320 is greater than an area of the second surface 330. The first direction and the second direction are any two extension directions of the jelly roll 300, and the first direction intersects with the second direction.

It should be noted that only one first surface 320 and one second surface 330 are shown in FIG. 3.

Still referring to FIG. 3, for example, the jelly roll 300 is of a cuboid structure. In this case, the first direction may be a length direction (refer to a direction a in FIG. 3) of the jelly roll 300, and the second direction may be a width direction (refer to a direction b in FIG. 3) of the jelly roll 300. In other words, the first direction and the second direction may be perpendicular to each other. The two first surfaces 320 are respectively two surfaces of the jelly roll 300 that are disposed opposite to each other in the length direction (direction a), and the two second surfaces (330) are respectively two surfaces of the jelly roll 300 that are disposed opposite to each other in the width direction (direction b).

During specific disposing, an arc chamfer may be used for transition between the first surface 320 and any second surface 330. The area of the first surface 320 is greater than the area of the second surface 330.

Referring to FIG. 3, first surfaces 320 of two adjacent jelly rolls 300 are disposed opposite to each other in the extension direction (direction x) of the module casing 100. For example, when all the jelly rolls 300 are assembled into the module casing 100, the length direction (direction a) of each jelly roll 300 is the same as the extension direction (direction x) of the module casing 100, so that in the plurality of jelly rolls 300 disposed at intervals in the extension direction (direction x) of the module casing 100, the first surfaces 320 of the two adjacent jelly rolls 300 are disposed opposite to each other, that is, first surfaces 320 of all the jelly rolls 300 are disposed at intervals in the extension direction (direction x) of the module casing 100.

In this embodiment of this application, it is set that for the jelly roll 300, the area of the first surface 320 is greater than the area of the second surface 330, and the first surfaces 320 of the two adjacent jelly rolls 300 disposed in the extension direction of the module casing 100 are disposed opposite to each other. In this way, when there is a fixed size of the module casing 100 in the extension direction, more jelly rolls 300 are disposed. Therefore, manufacturing materials of the module casing 100 are saved, and energy density of the battery module is improved.

Scenario 2

Figure 5:
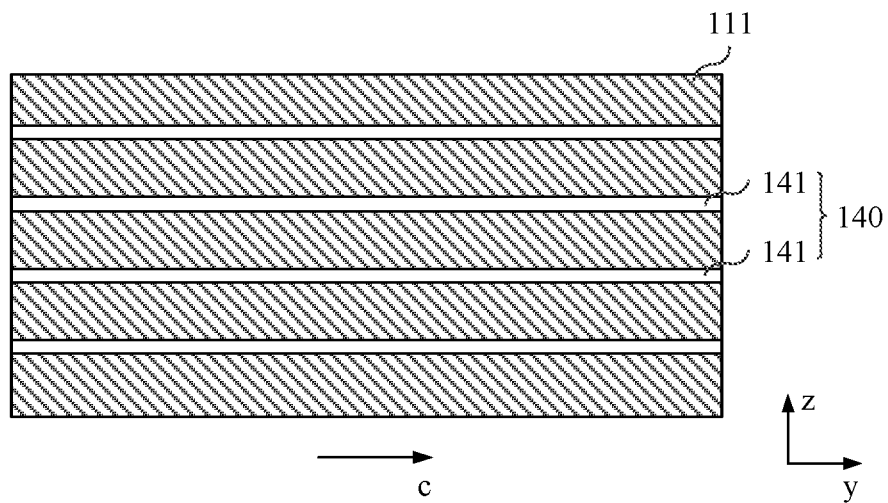
FIG. 5 is a schematic diagram of a first internal structure of a first sidewall of a module housing in FIG. 4.
Figure 6:
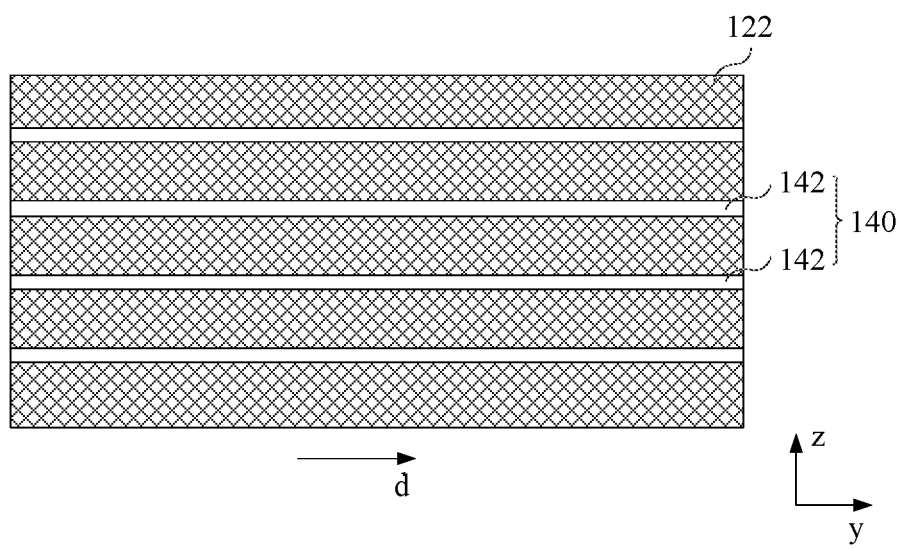
FIG. 6 is a schematic diagram of a first internal structure of a second partition part in FIG. 4.

FIG. 5 is a schematic diagram of a first internal structure of a first sidewall of a module housing in FIG. 4, and FIG. 6 is a schematic diagram of a first internal structure of a second partition part in FIG. 4. Refer to FIG. 5 and FIG. 6. In actual application, a battery module obtained after a plurality of jelly rolls 300 are connected in series or in parallel has a shorter service life than a single electrochemical cell because of inconsistency of the jelly rolls 300 and inconsistency of heat distribution in a working process of a battery.

Referring to FIG. 5 and FIG. 6, to prolong the service life of the battery module, on the basis of scenario 1, a cooling channel 140 is formed on at least one of the module housing 110 and the partition part 120 in this embodiment of this application. The cooling channel 140 is used for circulation of a cooling medium such as coolant or cold air.

It should be noted that in this embodiment of this application, the cooling channel 140 is disposed at any position of the sidewall of the module housing 110 or the partition part 120 in a thickness direction. The module housing 110 is used as an example. Any sidewall of the module housing 110 has a specific thickness. For example, the first sidewalls 111 of the module housing 110 include an inner sidewall and an outer sidewall that are disposed opposite to each other in the thickness direction, and the cooling channel 140 is disposed at any position between the inner sidewall and the outer sidewall. In this embodiment of this application, the cooling channel 140 uses a wall thickness of the sidewall without occupying the inner cavity of the module housing 110.

For example, in this embodiment of this application, the cooling channel 140 may be formed on each of the two first sidewalls 111 and the two second sidewalls 112 of the module housing 110, and the cooling channel 140 may also be formed on each partition part 120. In addition, two through holes that communicate with the corresponding cooling channel 140 may be disposed on each of the first sidewall 111, the second sidewall 112, and each partition part 120. That is, two through holes are disposed on the first sidewall 111, and both the two through holes communicate with the cooling channel 140 on the first sidewall 111; two through holes are disposed on the second sidewall 112, and the two through holes communicate with the cooling channel 140 on the second sidewall 112; and two through holes are also disposed on each partition part 120, and the two through holes communicate with the cooling channel 140 on the partition part 120.

One through hole on any sidewall of the module housing 110 or the partition part 120 serves as an inlet of the cooling channel 140, and the other through hole serves as an outlet of the cooling channel 140. A cooling medium is injected into the corresponding cooling channel 140 through the inlet, and is discharged from the outlet to an outside of the module housing 110 after heat exchange is performed with the jelly roll 300 in the inner cavity of the module housing 110, to dissipate heat for the jelly roll 300 in the module casing 100.

In this embodiment of this application, the cooling channel 140 is formed on the at least one of the module housing 110 and the partition part 120, so that a cooling medium such as coolant or cold air is injected into the cooling channel 140 to remove heat transferred from the jelly roll 300 to the module housing 110 or the partition part 120 and to ensure normal working of the jelly roll 300 in the module casing 100, to prolong the service life of the battery module.

In addition, by forming the cooling channel 140 on the module housing 110 or the partition part 120, space of the module housing 110 or the partition part 120 in the thickness direction is properly used, and space occupied by the cooling channel 140 in the inner cavity of the module housing 110 is saved. Therefore, more jelly rolls 300 are disposed, and energy density of the battery module is improved.

It may be understood that during specific manufacturing, the cooling channel 140 may be disposed on the module housing 110 or the partition part 120 of the formed module casing 100, or may be disposed on the module housing 110 or the partition part 120 through integral injection molding when the module casing 100 is manufactured. A manner of manufacturing the cooling channel 140 is not limited in this embodiment of this application.

Referring to FIG. 3, it may be learned from scenario 1 that the first surfaces 320, of the two adjacent jelly rolls 300, with a larger area are disposed opposite to each other in the extension direction of the module casing 100. An extension direction (refer to a direction d in FIG. 6) of the second partition part 122 in the partition parts 120 is the same as the width direction (refer to the direction y in FIG. 4) of the module casing 100. Therefore, two surfaces of the second partition part 122 that are disposed opposite to each other in a thickness direction are disposed opposite to the first surfaces 320 of the jelly rolls 300. Based on this, to simplify a structure of the module casing 100, in this embodiment of this application, the cooling channel 140 may be formed on each of the module housing 110 and each second partition part 122.

For example, the cooling channel 140 may be formed on each of the four sidewalls of the module housing 110 and the second partition part 122, so that when the first surfaces 320, of the two adjacent jelly rolls 300, with a larger area are disposed opposite to each other in the extension direction of the module casing 100, coolant or cold air on the first sidewall 111 of the module housing 110 and the second partition part 122 may be used to dissipate heat for the first surfaces 320, of the jelly rolls 300, with a larger area, to ensure heat dissipation efficiency for the jelly roll 300 in the module casing 100 while simplifying the structure of the module casing 100.

Referring to FIG. 5 and FIG. 6, for ease of description, in this embodiment of this application, the cooling channel 140 disposed on the module housing 110 is used as a first cooling channel 141, and the cooling channel 140 disposed on the second partition part 122 is used as a second cooling channel 142.

In this embodiment of this application, the first cooling channel 141 is formed on each of the two first sidewalls 111 and the two second sidewalls 112 of the module housing 110, and an extension direction of the first cooling channel 141 is the same as an extension direction of a corresponding sidewall. For example, an extension direction of a first cooling channel 141 on the first sidewall 111 is the same as an extension direction (refer to a direction c in FIG. 5) of the first sidewall 111. The extension direction of the first sidewall 111 is the same as the width direction of the module casing 100. An extension direction of a first cooling channel 141 on the second sidewall 112 is the same as an extension direction of the second sidewall 112. The extension direction of the second sidewall 112 is the same as the extension direction (refer to the direction x in FIG. 4) of the module casing 100.

The first cooling channels 141 on the first sidewall 111 and the second sidewall 112 communicate with each other. For example, two ends of a first cooling channel 141 on any one of the first sidewalls 111 respectively extend to first cooling channels 141 on the two second sidewalls 112, so that the first cooling channels 141 on the four sidewalls of the module housing 110 form a communicating annular channel.

Referring to FIG. 6, the second cooling channel 142 is formed on the second partition part 122, and two ends of the second cooling channel 142 respectively extend to first cooling channels 142 on the two second sidewalls 112. For example, the second cooling channel 142 on the second partition part 122 extends in the extension direction (refer to the direction d in FIG. 6) of the second partition part 122, and the two ends of the second cooling channel 142 respectively extend to communicate with the first cooling channels 141 on the two second sidewalls 112. The extension direction of the second partition part 122 is the same as the width direction of the module casing 100.

When coolant such as cold water is injected into each of the first cooling channel 141 and the second cooling channel 142, a water inlet may be disposed on one of the first sidewalls 111, for example, a left sidewall 1111, of the module housing 110, and a water outlet may be disposed on the other first sidewall 111, for example, a right sidewall 1112.

Figure 7:
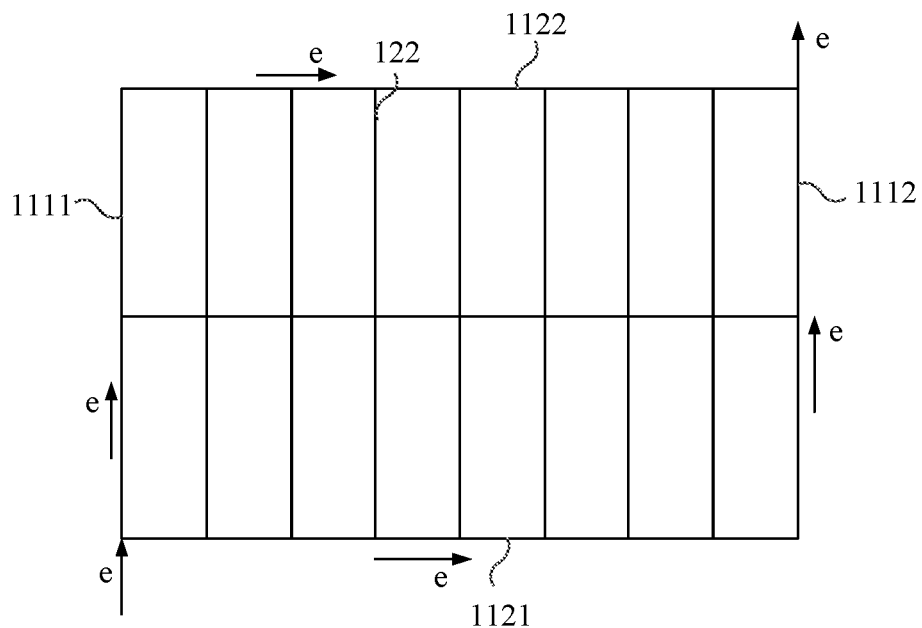
FIG. 7 is a schematic diagram of a flow path of a cooling medium in a module casing in FIG. 1.
Figure 8:
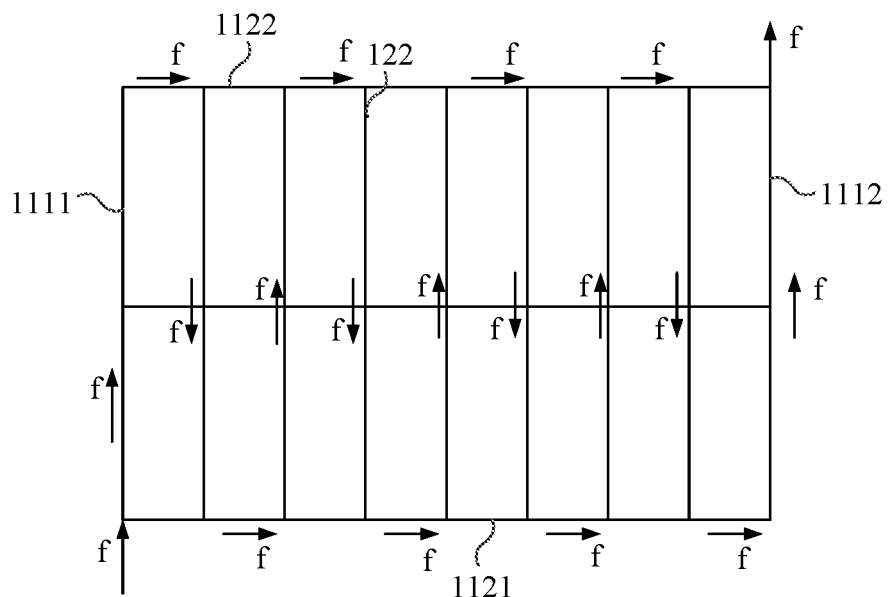
FIG. 8 is a schematic diagram of another flow path of a cooling medium in a module casing in FIG. 1.

FIG. 7 is a schematic diagram of a flow path of a cooling medium in a module casing in FIG. 1, and FIG. 8 is a schematic diagram of another flow path of a cooling medium in a module casing in FIG. 1. Refer to FIG. 7 and FIG. 8. The following specifically describes a flow path of coolant in detail by using an example in which coolant such as cold water is injected into each of the first cooling channel 141 and the second cooling channel 142, the water inlet is disposed on the left sidewall 1111 of the module housing 110, and the water outlet is disposed on the right sidewall 1112.

Coolant is injected into the first cooling channel 141 on the module housing 110 from the water inlet, and the coolant flows in at least the following several paths:

Refer to FIG. 7, a first flow path is as follows: The coolant flows into the two second sidewalls 112, for example, a front sidewall 1121 and a rear sidewall 1122, in an extension direction of the left sidewall 1111, then flows into the right sidewall 1112 from the front sidewall 1121 and the rear sidewall 1122, and finally is discharged from the water outlet on the right sidewall 1112. A direction indicated by an arrow e in FIG. 7 is a flow direction of the coolant in the first flow path.

FIG. 8 is a schematic diagram of another flow path of a cooling medium in a module casing in FIG. 1. Refer to FIG. 8. A second flow path is as follows: After flowing into a rear sidewall 1122 or a front sidewall 1121, the coolant injected into the left sidewall 1111 from the water inlet sequentially enters second partition parts 122 through a first cooling channel 141 on the rear sidewall 1122 or the front sidewall 1121, then enters the right sidewall 1112 from the second cooling channel 142 on the second partition part 122, and finally is discharged from the water outlet on the right sidewall 1112. A direction indicated by an arrow f in FIG. 8 is a flow direction of the coolant in the second flow path.

The water inlet may be disposed at a front end of one of the first sidewalls 111, for example, the left sidewall 1111, and the water outlet may be disposed at a rear end of the other first sidewall 111, for example, the right sidewall 1112. In this way, refer to FIG. 7. In the first flow path, a part of the coolant injected into the left sidewall 1111 from the water inlet sequentially reaches the water outlet from the left sidewall 1111 and the rear sidewall 1122, and finally is discharged from the water outlet to an outside of the module casing 100, and the other part sequentially reaches the water outlet on the right sidewall 1112 from the front sidewall 1121 and the right sidewall 1112, and finally is discharged from the water outlet to the outside of the module casing 100.

Referring to FIG. 8, in the second flow path, the coolant flows into the rear sidewall 1122 from the left sidewall 1111, flows into a second partition part 122 that appears first and that is close to the left sidewall 1111 from the first cooling channel 141 on the rear sidewall 1122, flows into the front sidewall 1121 from the second partition part 122 that appears first, and then flows into a second partition part 122 that appears second from the first cooling channel 141 on the front sidewall 1121, and then the coolant flows into the rear sidewall 1122 from the second partition part 122 that appears second. In this way, the coolant continuously flows in a direction close to the right sidewall 1112 through the rear sidewall 1122, the second partition part 122, and the front sidewall 1121 until the coolant flows into the right sidewall 1112 from the rear sidewall 1122 or the front sidewall 1121, and finally is discharged from the water outlet on the right sidewall 1112.

It should be noted that second partition parts 122 sequentially disposed in a direction (for example, the direction x in FIG. 4) from the left sidewall 1111 to the right sidewall 1112 are used as the second partition part 122 that appears first, the second partition part 122 that appears second, a second partition part 122 that appears third, . . . , and so on. Therefore, the second partition part 122 that appears first is a second partition part 122 adjacent to the left sidewall 1111, and the second partition part 122 that appears second is a second partition part 122 that is on a right side of the second partition part 122 that appears first and that is adjacent to the second partition part 122 that appears first.

It may be understood that when the quantity of second partition parts 122 is an odd number such as 1, 3, or 5, in the second flow path, when the coolant first flows into the rear sidewall 1122 from the left sidewall 1111, coolant that flows out from a second partition part 122 adjacent to the right sidewall 1112 flows into the right sidewall 1112 from the front sidewall 1121, and finally is discharged from the water outlet on the right sidewall 1112.

When the quantity of second partition parts 122 is an even number such as 2, 4, or 6, in the second flow path, when the coolant first flows into the rear sidewall 1122 from the left sidewall 1111, coolant that flows out from a second partition part 122 adjacent to the right sidewall 1112 flows into the right sidewall 1112 from the rear sidewall 1122, and finally is discharged from the water outlet on the right sidewall 1112.

In this application, the first cooling channels 141 on the module housing 110 are disposed to communicate, and the first cooling channel 141 and the second cooling channel 142 on the second partition part 122 are disposed to communicate, so that the first cooling channel 141 and the second cooling channel 142 form a communicating network structure on the module casing 100. In this way, coolant or cold air injected from the first cooling channel 141 on any sidewall can flow into a second cooling channel 142 on each second partition part 122, to effectively dissipate heat for each jelly roll 300.

In addition, the first cooling channels 141 are disposed in extension directions of the four sidewalls of the module housing 110, and the second cooling channel 142 is disposed in the extension direction of the second partition part 122, so that cooling media in the first cooling channel 141 and the second cooling channel 142 can be used to dissipate heat for each jelly roll 300 disposed in the extension direction of the module casing 100 and to dissipate heat for each jelly roll 300 disposed in the width direction of the module casing 100, to improve heat dissipation efficiency of the battery module.

In this embodiment of this application, the water inlet and the water outlet are respectively disposed on the two first sidewalls 111, so that coolant injected from the water inlet into one of the first sidewalls 111 can enter each second partition part 122 through the two second sidewalls 112, then flows into the other first sidewall 111, and finally is discharged from the water outlet on the other first sidewall 111 to an outside of the battery module, to extend a circulation path of the coolant and ensure that the coolant can be used to effectively dissipate heat for each jelly roll 300.

Certainly, in some examples, the water inlet and the water outlet may be respectively disposed on the two second sidewalls 112 (not shown in the figure). For example, the water inlet may be disposed on one of the second sidewalls 112, for example, a rear sidewall 1122, and the water outlet may be disposed on the other second sidewall 112, for example, a front sidewall 1121. After coolant is injected from the water inlet on one of the second sidewalls 112, for example, a top wall, the coolant flows in at least the following several paths:

First flow path: The coolant injected into the rear sidewall 1122 from the water inlet flows into a left sidewall 1111 and a right sidewall 1112 in an extension direction of the rear sidewall 1122, then flows into the front sidewall 1121 from the left sidewall 1111 and the right sidewall 1112, and finally is discharged from the water outlet on the front sidewall 1121.

Second flow path: The coolant injected into the rear sidewall 1122 from the water inlet sequentially enters second partition parts 122 through a first cooling channel 141 on the rear sidewall 1122, then enters the front sidewall 1121 from a front end of the second partition part 122, and finally is discharged from the water outlet on the front sidewall 1121.

For example, the water inlet is disposed at a left end of the rear sidewall 1122, and the water outlet is disposed at a right end of the front sidewall 1121. In the first flow path, a part of the coolant injected into the rear sidewall 1122 from the water inlet sequentially reaches the water outlet from the left sidewall 1111 and the front sidewall 1121, and finally is discharged from the water outlet to an outside of the module casing 100, and the other part sequentially reaches the water outlet on the front sidewall 1121 from the rear sidewall 1122 and the right sidewall 1112, and finally is discharged from the water outlet to the outside of the module casing 100.

In the second flow path, the coolant injected into the rear sidewall 1122 from the water inlet first flows into a second partition part 122 that appears first and that is close to the left sidewall 1111, then flows into the front sidewall 1121 from the second partition part 122 that appears first, and then flows into a second partition part 122 that appears second from a first cooling channel 141 on the front sidewall 1121, and then the coolant flows into the rear sidewall 1122 from the second partition part 122 that appears second. In this way, the coolant continuously flows in a direction close to the right sidewall 1112 through the rear sidewall 1122, the second partition part 122, and the front sidewall 1121 until the coolant flows into the front sidewall 1121 from a front end of a second partition part 122 close to the right sidewall 1112, and finally is discharged from the water outlet on the front sidewall 1121 to the outside of the module casing 100.

In this embodiment of this application, coolant is injected into each of the first cooling channel 141 and the second cooling channel 142, to improve heat dissipation efficiency for each jelly roll 300.

Referring to FIG. 5, during specific disposing, there may be a plurality of first cooling channels 141, and the plurality of first cooling channels 141 are disposed at intervals in a height direction (refer to a direction z in FIG. 4 and FIG. 5) of the module housing 110. For example, a plurality of first cooling channels 141 are disposed on each of the first sidewall 111 and the second sidewall 112 of the module housing 110, and the plurality of first cooling channels 141 are disposed at intervals in a height direction of the first sidewall 111 or the second sidewall 112.

Referring to FIG. 6, correspondingly, there are a plurality of second cooling channels 142, the plurality of second cooling channels 142 are disposed at intervals in a height direction (refer to the direction z in FIG. 4 and FIG. 5) of the second partition part 122, and two ends of each second cooling channel 142 respectively communicate with corresponding first cooling channels 141. For example, the second cooling channels 142 are disposed at intervals in the height direction of the second partition part 122. A quantity of second cooling channels 142 is equal to a quantity of first cooling channels 141 on the first sidewall 111 or the second sidewall 112, and the first cooling channels 141 and the second cooling channels 142 are disposed in a one-to-one correspondence.

For example, four first cooling channels 141 are disposed on each of the first sidewall 111 and the second sidewall 112 of the module housing 110, the four first cooling channels 141 are disposed at intervals and in parallel in the height direction of the module housing 110, four second cooling channels 142 are disposed on the second partition part 122, and the four second cooling channels 142 are disposed at intervals and in parallel in the height direction of the module housing 110, namely, the height direction of the second partition part 122. The four second cooling channels 142 are disposed to communicate with the four first cooling channels 141 on the two second sidewalls 112 in a one-to-one correspondence.

The first cooling channel 141 and the second cooling channel 142 that communicate with each other may be used as a cooling structure. In the foregoing example, there are four cooling structures. For a flow path of a cooling medium in each cooling structure, directly refer to the foregoing content. Details are not described herein. The four cooling structures are independent of each other. During specific heat dissipation, a cooling medium such as coolant may be injected into each of the four cooling structures, or a cooling medium may be injected into any one or more of the four cooling structures based on an actual situation, to save resources.

In this embodiment of this application, a plurality of cooling channels 140 are disposed on each of the module housing 110 and the second partition part 122, and the plurality of cooling channels 140 are disposed at intervals in the height direction of the module casing 100, so that a cooling medium is injected into the plurality of cooling channels 140, to increase a heat exchange area between the cooling channel 140 and the jelly roll 300 in the height direction, to improve heat dissipation efficiency of the battery module.

Scenario 3

Figure 9:
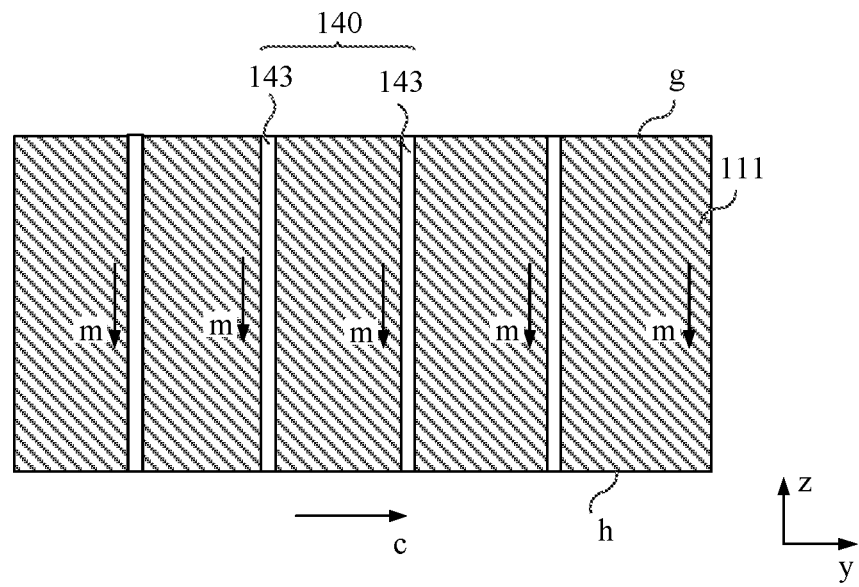
FIG. 9 is a schematic diagram of a second internal structure of a first sidewall of a module housing in FIG. 4.
Figure 10:
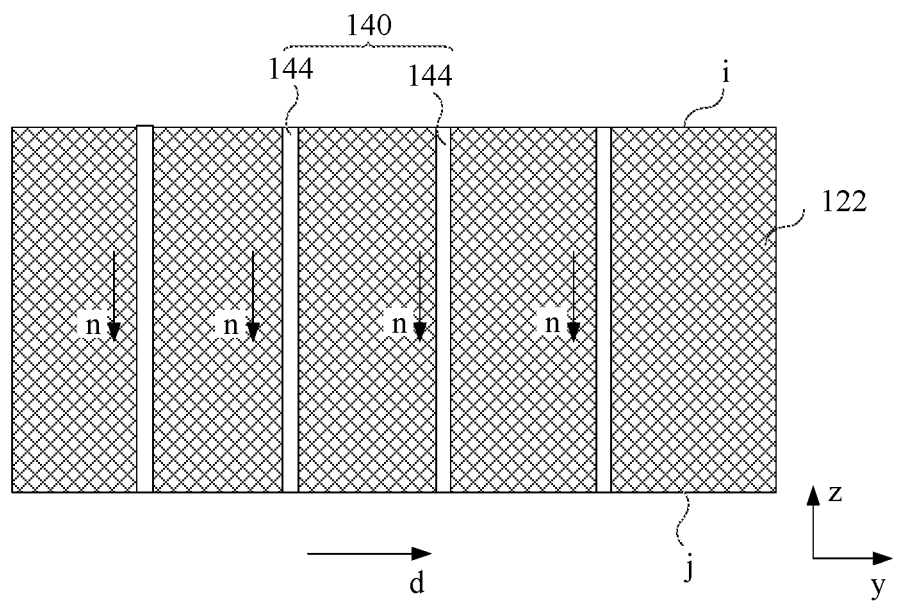
FIG. 10 is a schematic diagram of a second internal structure of a second partition part in FIG. 4.

FIG. 9 is a schematic diagram of a second internal structure of a first sidewall of a module housing in FIG. 4, and FIG. 10 is a schematic diagram of a second internal structure of a second partition part in FIG. 4. Referring to FIG. 9 and FIG. 10, a difference from scenario 2 is that a third cooling channel 143 is formed on the module housing 110, and a fourth cooling channel 144 is formed on the second partition part 122. The third cooling channel 143 extends in the height direction (refer to a direction z in FIG. 4 and FIG. 9) of the module housing 110, and two ends of the third cooling channel 143 penetrate through a top surface and a bottom surface of the module housing 110. In this way, a top surface opening and a bottom surface opening of the module housing 110 may be respectively used as an inlet and an outlet of the third cooling channel 143.

It should be noted that similar to scenario 2, the third cooling channel 143 is located on any sidewall of the module housing 110. For example, refer to FIG. 9. The third cooling channel 143 is disposed on the two first sidewalls 111 of the module housing 110. The first sidewalls 111 include an inner wall and an outer wall disposed opposite to each other in the thickness direction. The third cooling channel 143 is located at any position between the inner wall and the outer wall, and two ends of the third cooling channel 143 penetrate through a top surface (as shown in g in FIG. 9) and a bottom surface (as shown in h in FIG. 9) of the first sidewall 111. The top surface g of the first sidewall 111 and the bottom surface h of the first sidewall 111 are respectively two surfaces of the first sidewall 111 that are disposed opposite to each other in the height direction.

Referring to FIG. 9, for example, a top surface opening of the first sidewall 111 is the inlet, and a bottom surface opening of the first sidewall 111 is the outlet. When heat dissipation needs to be performed, a cooling medium is injected into the third cooling channel 143 from the top surface opening of the first sidewall 111, and is discharged from the bottom surface opening of the first sidewall 111 after heat exchange is performed with the jelly roll 300 in the inner cavity of the module housing 110. A direction indicated by an arrow m in FIG. 9 is a flow direction of the cooling medium on the first sidewall 111 in this example.

Referring to FIG. 10, the fourth cooling channel 144 is located in the second partition part 122. For example, the second partition part 122 includes two surfaces disposed opposite to each other in the thickness direction, the fourth cooling channel 144 is located at any position between the two surfaces, and two ends of the fourth cooling channel 144 penetrate through a top surface i and a bottom surface j of the second partition part 122. The top surface i of the second partition part 122 and the bottom surface j of the second partition part 122 are respectively two surfaces of the second partition part 122 that are disposed opposite to each other in the height direction.

In addition, the fourth cooling channel 144 extends in the height direction (refer to the direction z in FIG. 4 and FIG. 9) of the second partition part 122, and the two ends of the fourth cooling channel 144 penetrate through the top surface (as shown in i in FIG. 10) and the bottom surface (as shown in j in FIG. 10) of the second partition part 122. In this way, a top surface opening and a bottom surface opening of the second partition part 122 may be respectively used as an inlet and an outlet of the fourth cooling channel 144.

Referring to FIG. 10, for example, the top surface opening of the second partition part 122 is the inlet, and the bottom surface opening of the second partition part 122 is the outlet. When heat dissipation needs to be performed, a cooling medium is injected into the fourth cooling channel 144 from the top surface opening of the second partition part 122, and the cooling medium is discharged from the bottom surface opening of the second partition part 122 after heat exchange is performed with the jelly roll 300 in the inner cavity of the module housing 110. A direction indicated by an arrow n in FIG. 10 is a flow direction of the cooling medium in the second partition part 122 in this example.

It may be learned from scenario 1 that the first surfaces 320, of the two adjacent jelly rolls 300, with a larger area may be disposed opposite to each other in the extension direction of the module casing 100. Each of the extension direction (refer to a direction d in FIG. 10) of the second partition part 122 and the extension direction (refer to a direction c in FIG. 9) of the first sidewall 111 is the same as the width direction (refer to a direction y in FIG. 9 and FIG. 10) of the module casing 100. Therefore, both the second partition part 122 and the first sidewall 111 are disposed opposite to the first surfaces 320 of the jelly rolls 300.

Based on this, to simplify a manufacturing process of the battery module, the third cooling channel 143 may be formed only on each first sidewall 111 of the module housing 110, and the fourth cooling channel 144 may be formed on the second partition part 122. In this way, coolant or cold air that enters the third cooling channel 143 from the top surface g or the bottom surface h of the first sidewall 111 may be used to dissipate heat for a first surface 320 of a jelly roll 300 close to the first sidewall 111, and coolant or cold air that enters the fourth cooling channel 144 from the top surface i or the bottom surface j of the second partition part 122 may be used to dissipate heat for first surfaces 320 of jelly rolls 300 on both sides of the second partition part 122. Therefore, while a heat dissipation effect of the jelly roll 300 in the module casing 100 is ensured, the structure of the battery module is simplified, and manufacturing efficiency of the battery module is improved.

In addition, the two ends of the third cooling channel 143 penetrate through the top surface g and the bottom surface h of the first sidewall 111, so that a cooling medium that enters the first sidewall 111 from one end of the first sidewall 111 in the height direction can be smoothly discharged from the other end of the first sidewall 111 in the height direction to the outside of the module casing 100, to improve circulation efficiency of the medium in the third cooling channel 143, to improve heat dissipation efficiency of jelly rolls 300 on one side of the first sidewall 111.

Correspondingly, the two ends of the fourth cooling channel 144 respectively penetrate through the top surface i and the bottom surface j of the second partition part 122, so that a cooling medium that enters the fourth cooling channel 144 from one end of the second partition part 122 in the height direction can be smoothly discharged from the other end of the second partition part 122 in the height direction to the outside of the module casing 100, to improve circulation efficiency of the medium in the fourth cooling channel 144, to improve heat dissipation efficiency of jelly rolls 300 on one side of the second partition part 122.

During specific heat dissipation, both the third cooling channel 143 and the fourth cooling channel 144 may be used for circulation of cold air, and heat dissipation is performed for the jelly roll 300 in the module casing 100 by using the cold air. In addition, the third cooling channel 143 and the fourth cooling channel 144 facilitate entry of air outside the module casing 100, and also facilitate discharge of air inside the module casing 100 to the outside. That is, in the manner of disposing the third cooling channel 143 and the fourth cooling channel 144, circulation of cold air inside and outside the module casing 100 is facilitated, to effectively dissipate heat for the jelly roll 300 in the module casing 100.

There may be a plurality of third cooling channels 143 and a plurality of fourth cooling channels 144, and the plurality of third cooling channels 143 and the plurality of fourth cooling channels 144 are disposed at intervals in a direction perpendicular to the extension direction (for example, the direction y in FIG. 4, FIG. 9, and FIG. 10) of the module casing 100. For example, the plurality of third cooling channels 143 are disposed at intervals in the width direction of the module casing 100, namely, the extension direction of the first sidewall 111, and the plurality of fourth cooling channels 144 are disposed at intervals in the width direction of the module casing 100, namely, the extension direction of the second partition part 122, so that a cooling medium such as cold air is injected into each of the plurality of third cooling channels 143 and the plurality of fourth cooling channels 144, to increase a heat exchange area between the cooling channel 140 on the module casing 100 and the jelly roll 300 in the width direction, to improve heat dissipation efficiency of the jelly roll 300 with respect to the cooling channel 140 on the module casing 100.

An embodiment of this application further provides a battery pack, including a battery pack casing and a plurality of battery modules in any one of the foregoing scenarios. All of the plurality of battery modules are fastened to the battery pack casing.

The battery pack casing may be the module casing 100 in any of the foregoing scenarios. For example, the battery pack casing includes a plurality of grooves 130, and the plurality of battery modules are respectively embedded in the corresponding grooves 130. In addition, jelly rolls 300 in two adjacent battery modules may be connected in series or in parallel by using a copper bar connected to a battery post 210, so that the plurality of battery modules fastened to the battery pack casing form the battery pack with more energy.

In this embodiment of this application, the plurality of battery modules are fastened to the battery pack casing to form the battery pack. In this way, a structure and a manufacturing process of the battery pack are simplified, and manufacturing costs of the battery pack are reduced.

An embodiment of this application further provides a vehicle. The vehicle includes an electrical device and the foregoing battery module, or includes an electrical device and the foregoing battery pack. The battery module or the battery pack is electrically connected to the electrical device, to supply electric energy to the electrical device.

It should be noted that the vehicle in this embodiment of this application includes but is not limited to any one of an electric vehicle (EV), a pure electric vehicle (PEV/BEV), a hybrid electric vehicle (HEV), a range-extended electric vehicle (REEV), a plug-in hybrid electric vehicle (PHEV), and a new energy vehicle.

The electric vehicle is used as an example. The electrical device may be a drive motor, and a battery pack or a battery module in the electric vehicle is electrically connected to the drive motor, to supply electric energy to the drive motor, so that the drive motor normally works.

In this embodiment of this application, the foregoing battery module or battery pack is disposed in the vehicle. In this way, a structure and a manufacturing process of the battery pack or the battery module are simplified, and therefore a manufacturing process of the entire vehicle is simplified, and manufacturing costs of the entire vehicle are reduced.

In the descriptions of the embodiments of this application, it should be noted that, unless otherwise clearly specified and limited, terms "mounting", "connect", and "connection" should be understood in a broad sense. For example, the terms may be used for a fixed connection, a connection through intermediate media, an internal connection between two elements, or an interaction relationship between two elements. A person of ordinary skill in the art may understand specific meanings of the foregoing terms in this application based on specific situations.

In the specification, claims, and accompanying drawings of embodiments of this application, the terms "first", "second", "third", "fourth", and so on (if existent) are intended to distinguish between similar objects but do not necessarily indicate a specific order or sequence.

What is claimed is:

1. A battery module, comprising:
    a module casing comprising a module housing and a plurality of partition parts located in the module housing, wherein one side of the module housing is an open structure, the partition parts partition an inner cavity of the module housing into a plurality of grooves, and a plurality of jelly rolls are embedded in the plurality of grooves;
    a top cover covers openings of the plurality of grooves to seal the plurality of grooves;
    wherein the module housing comprises two first sidewalls and two second sidewalls, the two first sidewalls are disposed opposite to each other in an extension direction of the module housing, and the two second sidewalls are disposed opposite to each other in a direction perpendicular to the extension direction of the module housing;
    the plurality of partition parts comprise a first partition part and a second partition part that are crosswise disposed, two ends of the first partition part respectively extend to the two first sidewalls, and two ends of the second partition part respectively extend to the two second sidewalls;
    wherein a first cooling channel is formed on each of the two first sidewalls and the two second sidewalls, an extension direction of the first cooling channel is the same as an extension direction of a corresponding sidewall, and first cooling channels on the first sidewall and the second sidewall communicate with each other; and
    a second cooling channel is formed on the second partition part, and two ends of the second cooling channel respectively extend to first cooling channels on the two second sidewalls.

2. The battery module according to claim 1, wherein each jelly roll comprises two first surfaces and two second surfaces;
    the two first surfaces are disposed opposite to each other in a first direction of said each jelly roll, the two second surfaces are disposed opposite to each other in a second direction of said each jelly roll, an area of the first surface is greater than an area of the second surface, and the first direction intersects with the second direction; and
    first surfaces of two adjacent jelly rolls from the plurality of jelly rolls are disposed opposite to each other in an extension direction of the module casing.

3. The battery module according to claim 1, wherein both the first cooling channel and the second cooling channel provide circulation of coolant.

4. The battery module according to claim 3, wherein a water inlet and a water outlet that communicate with the first cooling channel are formed on the module housing; and
    the water inlet and the water outlet are respectively disposed on the two first sidewalls, or the water inlet and the water outlet are respectively disposed on the two second sidewalls.

5. The battery module according to claim 1, further comprising:
    a plurality of first cooling channels and a corresponding plurality of second cooling channels;
    wherein the plurality of first cooling channels are disposed at intervals in a height direction of the module housing; and
    the plurality of second cooling channels are disposed at intervals in a height direction of the second partition part, and two ends of each second cooling channel respectively communicate with corresponding first cooling channels.

6. The battery module according to claim 1, wherein a third cooling channel is formed on each first sidewall, and a fourth cooling channel is formed on the second partition part; and
- the third cooling channel extends in a height direction of the first sidewall, two ends of the third cooling channel penetrate through a top surface and a bottom surface of the first sidewall, and
- the fourth cooling channel extends in a height direction of the second partition part, and two ends of the fourth cooling channel respectively penetrate through a top surface and a bottom surface of the second partition part.

7. The battery module according to claim 6, wherein both the third cooling channel and the fourth cooling channel provide circulation of cold air.

8. The battery module according to claim 6, further comprising:
- a plurality of third cooling channels and a plurality of fourth cooling channels, wherein the plurality of third cooling channels and the plurality of fourth cooling channels are disposed at intervals in a direction perpendicular to the extension direction of the module casing.

9. The battery module according to claim 1, further comprising a plurality of second partition parts, wherein the plurality of second partition parts are disposed at intervals in the extension direction of the module casing.

10. The battery module according to claim 1, further comprising a plurality of top covers, wherein each top cover covers an opening of a corresponding groove.

11. The battery module according to claim 10, wherein each top cover is connected to a tab of a corresponding jelly roll using a battery post, and the two adjacent jelly rolls are connected in parallel or in series using a conductive connector connected to the battery post.

12. A battery pack, comprising:
- a battery pack casing; and
- a plurality of battery modules, wherein all of the plurality of battery modules are fastened to the battery pack casing;
- wherein each battery module comprises a module casing, a top cover, and a plurality of jelly rolls,
- the module casing comprises a module housing and a plurality of partition parts located in the module housing, wherein one side of the module housing is an open structure, the partition parts partition an inner cavity of the module housing into a plurality of grooves, and the plurality of jelly rolls are embedded in the plurality of grooves,
- the top cover covers openings of the plurality of grooves to seal the plurality of grooves;
- wherein the module housing comprises two first sidewalls and two second sidewalls, the two first sidewalls are disposed opposite to each other in an extension direction of the module housing, and the two second sidewalls are disposed opposite to each other in a direction perpendicular to the extension direction of the module housing;
- the plurality of partition parts comprise a first partition part and a second partition part that are crosswise disposed, two ends of the first partition part respectively extend to the two first sidewalls, and two ends of the second partition part respectively extend to the two second sidewalls;
- wherein a first cooling channel is formed on each of the two first sidewalls and the two second sidewalls, an extension direction of the first cooling channel is the same as an extension direction of a corresponding sidewall, and first cooling channels on the first sidewall and the second sidewall communicate with each other; and
- a second cooling channel is formed on the second partition part, and two ends of the second cooling channel respectively extend to first cooling channels on the two second sidewalls.

13. The battery pack according to claim 12, wherein each jelly roll comprises two first surfaces and two second surfaces;
- the two first surfaces are disposed opposite to each other in a first direction of said each jelly roll, the two second surfaces are disposed opposite to each other in a second direction of said each jelly roll, an area of the first surface is greater than an area of the second surface, and the first direction intersects with the second direction; and
- first surfaces of two adjacent jelly rolls from the plurality of jelly rolls are disposed opposite to each other in an extension direction of the module casing.

14. A vehicle, comprising:
- a battery module, electrically connected to an electrical device, to supply electric energy to the electrical device;
- wherein the battery module comprises a module casing, a top cover, and a plurality of jelly rolls,
- the module casing comprises a module housing and a plurality of partition parts located in the module housing, one side of the module housing is an open structure, the partition parts partition an inner cavity of the module housing into a plurality of grooves, and the plurality of jelly rolls are embedded in the plurality of grooves;
- the top cover covers openings of the plurality of grooves to seal the plurality of grooves;
- wherein the module housing comprises two first sidewalls and two second sidewalls, the two first sidewalls are disposed opposite to each other in an extension direction of the module housing, and the two second sidewalls are disposed opposite to each other in a direction perpendicular to the extension direction of the module housing;
- the plurality of partition parts comprise a first partition part and a second partition part that are crosswise disposed, two ends of the first partition part respectively extend to the two first sidewalls, and two ends of the second partition part respectively extend to the two second sidewalls;
- wherein a first cooling channel is formed on each of the two first sidewalls and the two second sidewalls, an extension direction of the first cooling channel is the same as an extension direction of a corresponding sidewall, and first cooling channels on the first sidewall and the second sidewall communicate with each other; and
- a second cooling channel is formed on the second partition part, and two ends of the second cooling channel respectively extend to first cooling channels on the two second sidewalls.

15. The vehicle according to claim 14, wherein each jelly roll comprises two first surfaces and two second surfaces;
- the two first surfaces are disposed opposite to each other in a first direction of said each jelly roll, the two second surfaces are disposed opposite to each other in a second direction of said each jelly roll, an area of the first surface is greater than an area of the second surface, and the first direction intersects with the second direction; and first surfaces of two adjacent jelly rolls from the plurality of jelly rolls are disposed opposite to each other in an extension direction of the module casing.

16. A vehicle, comprising:

a battery pack, electrically connected to an electrical device, to supply electric energy to the electrical device;

wherein the battery pack comprises a battery pack casing and a plurality of battery modules, wherein all of the plurality of battery modules are fastened to the battery pack casing, wherein each battery module comprises a module casing, a top cover, and a plurality of jelly rolls, the module casing comprises a module housing and a plurality of partition parts located in the module housing, one side of the module housing is an open structure, the partition parts partition an inner cavity of the module housing into a plurality of grooves, and the plurality of jelly rolls are embedded in the plurality of grooves;

the top cover covers openings of the plurality of grooves to seal the plurality of grooves;

wherein the module housing comprises two first sidewalls and two second sidewalls, the two first sidewalls are disposed opposite to each other in an extension direction of the module housing, and the two second sidewalls are disposed opposite to each other in a direction perpendicular to the extension direction of the module housing;

the plurality of partition parts comprise a first partition part and a second partition part that are crosswise disposed, two ends of the first partition part respectively extend to the two first sidewalls, and two ends of the second partition part respectively extend to the two second sidewalls;

wherein a first cooling channel is formed on each of the two first sidewalls and the two second sidewalls, an extension direction of the first cooling channel is the same as an extension direction of a corresponding sidewall, and first cooling channels on the first sidewall and the second sidewall communicate with each other; and a second cooling channel is formed on the second partition part, and two ends of the second cooling channel respectively extend to first cooling channels on the two second sidewalls.

\* \* \* \* \*